United States Patent
Selles et al.

(10) Patent No.: US 9,105,073 B2
(45) Date of Patent: Aug. 11, 2015

(54) METHOD AND SYSTEM OF PRODUCING AN INTERACTIVE VERSION OF A PLAN OR THE LIKE

(75) Inventors: Didier Selles, Le Rouret (FR); Daniel Cochard, Roquebrune sur Argents (FR); Caroline Kamhoua Matchuendem, Vallauris (FR); Pierre-Jean Reissman, Villefranche sur Mer (FR)

(73) Assignee: AMADEUS S.A.S., Biot (FR)

( * ) Notice: Subject to any disclaimer, the term of this patent is extended or adjusted under 35 U.S.C. 154(b) by 54 days.

(21) Appl. No.: 13/454,540

(22) Filed: Apr. 24, 2012

(65) Prior Publication Data
US 2013/0278627 A1    Oct. 24, 2013

(51) Int. Cl.
*G06T 9/00* (2006.01)
*G06Q 10/02* (2012.01)

(52) U.S. Cl.
CPC . *G06T 9/00* (2013.01); *G06Q 10/02* (2013.01)

(58) Field of Classification Search
CPC ............. G06K 9/00; G06K 9/18; G06K 9/48; G06K 9/20; G06K 9/36; G06Q 10/00; G06Q 10/02; G06T 7/0083; G06T 9/00; G09G 5/00
USPC ........ 345/581, 626; 705/5; 382/181–231, 321
See application file for complete search history.

(56) References Cited

U.S. PATENT DOCUMENTS

| | | | |
|---|---|---|---|
| 3,938,089 A * | 2/1976 | McGregor et al. | 382/318 |
| 4,761,818 A * | 8/1988 | Bannai | 382/282 |
| 4,817,187 A * | 3/1989 | Lien | 382/253 |
| 5,010,500 A * | 4/1991 | Makkuni et al. | 715/863 |
| 5,129,046 A * | 7/1992 | Tanabe et al. | 345/441 |
| 5,191,525 A * | 3/1993 | LeBrun et al. | 715/229 |
| 5,276,628 A * | 1/1994 | Schneiderhan | 700/223 |
| 5,438,628 A * | 8/1995 | Spitz et al. | 382/181 |
| 5,809,167 A * | 9/1998 | Al-Hussein | 382/190 |
| 5,949,052 A * | 9/1999 | Longacre et al. | 235/462.08 |
| 5,987,173 A | 11/1999 | Kohno et al. | |
| 6,134,338 A * | 10/2000 | Solberg et al. | 382/113 |
| 6,361,438 B1 * | 3/2002 | Morihira | 463/31 |
| 6,525,716 B1 * | 2/2003 | Makino | 345/173 |
| 7,706,616 B2 * | 4/2010 | Kristensson et al. | 382/187 |
| 7,970,240 B1 * | 6/2011 | Chao et al. | 382/305 |
| 2001/0051001 A1 * | 12/2001 | Nakamura et al. | 382/154 |
| 2002/0099576 A1 | 7/2002 | MacDonald et al. | |
| 2003/0169925 A1 * | 9/2003 | Polonowski | 382/198 |
| 2003/0208386 A1 * | 11/2003 | Brondrup | 705/5 |

(Continued)

OTHER PUBLICATIONS

Illert, Automatic Digitization of Large Scale Maps, ACSM ASPRS Annual Conference, 1991 (6), pp. 113-122.*
Filipski et al, Automated Conversion of Engineering Drawings to CAD Form, Jul. 1992, IEEE, vol. 8i0, No. 7, pp. 1195-1209.*
European Patent Office, search report issued in application No. 12368011.8 dated Oct. 26, 2012.

(Continued)

*Primary Examiner* — Stephen R Koziol
*Assistant Examiner* — Brian Kravitz
(74) *Attorney, Agent, or Firm* — Thompson Hine LLP

(57) ABSTRACT

A method of producing an interactive plan of a location from an optical image of a plan of the same location, wherein the location includes a plurality of features of different types such as cabins and corridors, the method comprising the steps of applying a complex geometry and character recognition (COGCR) process to the optical image to determine a plurality of functional data representative of the plurality of features of different types; converting the plurality of functional data into a plurality of object models; combining the object models to construct the interactive plan for display to an end user.

41 Claims, 6 Drawing Sheets

(56) References Cited

U.S. PATENT DOCUMENTS

| | | | | |
|---|---|---|---|---|
| 2004/0054670 | A1* | 3/2004 | Noff et al. | 707/3 |
| 2004/0151377 | A1* | 8/2004 | Boose et al. | 382/193 |
| 2005/0149328 | A1* | 7/2005 | Huang et al. | 704/252 |
| 2006/0098871 | A1* | 5/2006 | Szummer | 382/173 |
| 2006/0170944 | A1* | 8/2006 | Arps et al. | 358/1.13 |
| 2006/0268259 | A1* | 11/2006 | Park | 356/71 |
| 2007/0075878 | A1* | 4/2007 | Furodet et al. | 341/50 |
| 2007/0116365 | A1* | 5/2007 | Kloer | 382/190 |
| 2007/0294375 | A1* | 12/2007 | Matsubara | 709/219 |
| 2008/0218515 | A1* | 9/2008 | Fukushima et al. | 345/424 |
| 2008/0267534 | A1* | 10/2008 | Madhvanath | 382/305 |
| 2008/0316545 | A1* | 12/2008 | Tomita | 358/450 |
| 2009/0015553 | A1* | 1/2009 | Hirahara et al. | 345/158 |
| 2009/0116698 | A1* | 5/2009 | Zhang et al. | 382/111 |
| 2009/0138291 | A1* | 5/2009 | Heinze | 705/5 |
| 2009/0190159 | A1* | 7/2009 | Toscano et al. | 358/1.15 |
| 2009/0219556 | A1* | 9/2009 | Kato et al. | 358/1.13 |
| 2010/0177965 | A1* | 7/2010 | Kanematsu | 382/182 |
| 2010/0268225 | A1* | 10/2010 | Coe et al. | 606/42 |
| 2010/0289642 | A1* | 11/2010 | Harrison | 340/541 |
| 2011/0052062 | A1* | 3/2011 | Chiu et al. | 382/176 |
| 2011/0141521 | A1* | 6/2011 | Qiao | 358/1.16 |
| 2011/0150336 | A1* | 6/2011 | Van | 382/182 |
| 2011/0213685 | A1* | 9/2011 | Flynn et al. | 705/30 |
| 2011/0215151 | A1* | 9/2011 | Li et al. | 235/462.01 |
| 2011/0268360 | A1* | 11/2011 | Antonijevic et al. | 382/177 |
| 2011/0289098 | A1* | 11/2011 | Oztaskent et al. | 707/769 |
| 2012/0053926 | A1* | 3/2012 | Satpute | 704/8 |
| 2012/0117069 | A1* | 5/2012 | Kawanishi et al. | 707/740 |
| 2012/0134589 | A1* | 5/2012 | Reddy | 382/182 |
| 2012/0143607 | A1* | 6/2012 | Longe et al. | 704/235 |
| 2012/0170804 | A1* | 7/2012 | Lin et al. | 382/103 |
| 2012/0254158 | A1* | 10/2012 | He | 707/722 |
| 2013/0127860 | A1* | 5/2013 | Hadap et al. | 345/426 |
| 2013/0139193 | A1* | 5/2013 | Fan et al. | 725/14 |
| 2013/0188887 | A1* | 7/2013 | Chan et al. | 382/312 |
| 2013/0238966 | A1* | 9/2013 | Barrus | 715/223 |

OTHER PUBLICATIONS

K. Kostopoulos: "Haptic Access to Conventional 2D Maps for the Visually Impaired", Journal of Multimodal User Interfaces, vol. 1, No. 2 2007, pp. 13-19, Retrieved from the Internet: URL:http://rd.springer.com/article/10.1007%2FBF02910055?LI-true#page-1 [retrieved on Oct. 25, 2012.

Dori D et al., "From Engineering Drawings to 3D CAD Models: Are We Ready Now?", Computer Aided Design, vol. 27, No. 4, Apr. 1, 1995, pp. 243-254, Eslevier Publishers BV., Barking, GB ISSN:0010-4485.

Yeh T et al., "Sikuli: Using GUI Screenshots for Search and Automation", UIST '09 Proceedings of the 22nd Annual ACM Symposium on User Interface Software and Technology, Oct. 4, 2009, pp. 183-192, ISBM: 1-60558-745-5 Retrieved from the Internet: URL:http://groups.csail.mit.edu/uid/projects/sikuli/sikuli-uist2009.pdf [retrieved on Mar. 29, 2011].

Lamberti F. et al, "Extensible GUIs for Remote Application Control on Mobile Devices", IEEE Computer Graphics and Applications, IEEE Service Center, New York, NY, vol. 28, No. 4, Jul. 1, 2008.

O. Okun et al. Page Segmentation and Zone Classification: The State of the Art, Language and Media Processing Laboratory Technical Report, Univ of Maryland, College Park, Nov. 1999, pp. 1-34, Retrieved from the Internet:URL:http://oai.dtic.mil/oai/oai?verb=getRecord&metadataPrefix=html&identifier=ADA458676 [retrieved on Oct. 26, 2012].

R. Potter: "Triggers: Guiding Automation with Pixels to Achieve Data Access" In: A. Cypher (Ed.): "Watch What I do: Programming by Demonstration", 1993, MIT Press, pp. 361-381.

European Patent Office, International Search Report and Written Opinion issued in International Application No. PCT/EP2013/001142 dated Jul. 26, 2013.

AU, Patent Examination Report No. 1; Patent Application No. 2013252158 (Jun. 22, 2015).

\* cited by examiner

METHOD AND SYSTEM OF PRODUCING AN INTERACTIVE VERSION OF A PLAN OR THE LIKE

FIELD OF THE INVENTION

The present invention relates to a method and system of producing an active version of a plan. The method and system may be used in conjunction with a reservation system or associated method to make a booking.

BACKGROUND OF THE INVENTION

In many travel related environments plans are provided, for example in a cruise reservation application, although there are plans in many other situations as well. In the present example, reference will be made to a cruise reservation process, although this is not intended to be a limitation to the scope of the present invention.

In the age of the Internet, passengers generally search for cruises by looking at the websites of specific travel providers or cruise ships. The passenger is able to view a deck plan during a selection and can open other windows to access a multimedia website in which a deck plan and photographs of cabins (and sometimes an associated cabin plan) can be viewed.

An end user is not able to simultaneously view the available cabins on the image. In addition, the end user is unable to select a particular cabin and there is no interactivity associated with the views and options available in a user interface.

The most common way in which the websites sell cruise solutions is as described above. The end user has access to images showing the various decks on the ship. This information is not accessible to a booking flow, although it can run in a parallel section of the websites associated with the ship. Alternatively, the booking information can be accessed by the end user in another window or another tab. The end user can further access photographs and videos showing the ship as would be the case for viewing the deck plan.

In a website associated with "cruise-deals" the end user can access photographs of the cabins; videos of the cabins; and a table of the cabins. The end user has no access to a deck plan or any information relating to booking. The "croisierenet" and "abcroisiere" websites use similar solutions. The end user is unable to see the location of the cabin of interest in relation to the ship in general.

In the case of the "cruise-direct" website, the end user has access to the same information as identified above in the other prior art examples. However, the end user can display booking information in another tab. As with all the other prior art examples, the ship plan is a non-interactive picture.

The above mentioned websites generally use the same solutions. None of these solutions offer any interactivity and are not linked to the booking process. As a result users can make choices based on viewed cabin plans, where those cabins are ultimately not available because they have already been booked. This is frustrating and can result in the end user deciding not bother to book anything, leading to loss of revenues for the cruise companies.

In a solution designed by "TravTech" for "cruise.com" the end user can view a deck plan and then place the mouse over a cabin to reveal further information, such as a photograph or the cabin category. The deck plan is still image-based and is not easily maintainable if changes are made.

The website "cdfcroisieresdefrance.com" discloses an image of the ship rather than a deck plan. An end user can place a mouse over a certain area of the image of the ship in order to display specific information.

US 2002/0099576 (MacDonald et al.) discloses a method and system for managing reservations such as cabins on cruise ships on the Internet with an interactive plan. The system provides graphical information and textual information relating to the room. When an end user moves a pointer over a room on the interactive image, there are parts of the image that are "clickable" in the context of an application. The availability of the cabins is regularly updated. The end user can book a cabin by clicking on the cabin in the interactive image. The system uses SmartDecks™ technology to update the representation of the available and non-available cabins on the interactive image. This application has a limited degree of interactivity and fails to provide much of the information customers require when considering which cabin to book. In addition, this application relies on the manual intervention of an administrator to detect cabin positions. The application makes use of a bitmap of the decks and is only able to process cabins. All other symbols and shapes are not able to be processed.

As a result, this reservation system only has information about cabin availability, but no information that may be relevant to other aspects, such as handicapped access, connecting cabins, distance to elevators, etc. From the end user point view, the experience is poor, with displays of static images as opposed to interactive representations. In addition, no search facility is provided with the exception of an availability search. Also, from a processing point of view, the manual entry requirement is a limitation.

In general, the prior art relates to displaying information relating to areas or the whole of the ship. There are certain prior art references that suggest further information can be accessed by using a mouse or other pointer to view further details of a particular location. The ability of an end user to engage with the prior art systems and ascertain availability and then go on to book a place is not possible. The prior art merely offers one or more layers of information to enable an end user to see some details of a particular cabin or other part of the ship.

SUMMARY OF THE INVENTION

The present invention provides a method and system as set out in the accompanying claims.

According to one aspect of the present invention there is provided a method of producing an interactive plan of a location from an optical image of a plan of the same location, wherein the location includes a plurality of features of different types such as cabins and corridors, the method comprising:

the steps of applying a complex geometry and character recognition (COGCR) process to the optical image to determine a plurality of functional data representative of the plurality of features of different types;

converting the plurality of functional data into a plurality of object models;

combining the object models to construct the interactive plan for display to an end user.

Optionally, the method comprises displaying the interactive plan and responding to an end user interaction with the object models in the plan to carry out predetermined functions.

Optionally, the method comprises applying different COGCR processes to different types of features to thereby produce different types of functional data for different types of features.

Optionally, the method comprises converting each type of functional data to a predetermined type of object model.

Optionally, functional data comprises symbols on the optical image of the plan and the method comprises the steps of:
- applying a mask representative of a predetermined symbol over the surface of the optical image;
- identifying locations of one or more symbols on the optical image which corresponds to the mask;
- storing the location of the identified symbol or symbols in a database.

Optionally, the method comprises completing the steps for each symbol of interest expected to be found on the optical image.

Optionally, the method comprises recovering the identified symbol locations from the database and creating an associated object model to apply to the interactive plan.

Optionally, the functional data relates to entities, such as cabins and corridors and wherein the method further comprises:
- identifying an entity and defining the entity by one or more topographical rules;
- locating one or more entities that match the one or more topographical rules; and
- storing the location of each entity that matches the one or more topographical rules.

Optionally, the method comprises forming an object model corresponding to the entity by virtue of the topographical rules which are matched.

Optionally, the object model includes details of the shape of the entity, the method further comprising determining the shape of the entity by tokenizing the image into predetermined shape elements or color elements.

Optionally, the tokenizing step comprises:
- moving from pixel to pixel searching for homogenous pixels which appear to relate to a feature in the image;
- analyzing each pixel to determine whether each or any of its surrounding pixels forms in combination with the said pixel a possible predetermined shape element or color element;
- building a database of shape elements and/or color elements and location for future use in the interactive plan.

Optionally, the method comprises classifying and identifying certain objects as cabins or the like for use in the interactive plan.

Optionally, the optical image includes alpha numeric representations, and the method further comprises:
- applying an optical character recognition process to the image to identify alpha numeric characters;
- comparing the alpha numeric characters with a list of words and/or numbers on the image to determine any matches; and
- forming an object structure of any matches for use in the interactive plan.

Optionally, the method comprises vectorizing any lines and corners identified during the processing of the image to form a set of vectors indicating the direction and size of movement from one pixel to the next in an identified line or corner.

Optionally, the method comprises applying rules at any point to control processing of the optical image to form the interactive plan.

Optionally, the method comprises drawing a layout of the interactive plan and adding the object structures from any process to form a representation of the optical image in the form of a display of the interactive plan.

Optionally, the method comprises detecting end user interaction with the display of the interactive plan to carry out an action based on the interaction.

Optionally, the method comprises linking the interactive plan to a booking flow to enable an end user to interact within the interactive plan, to select an entity, such as a cabin for booking, and completing the booking if the entity is available.

Optionally, the method comprises obtaining directions to a requested location using the interactive plan.

According to a second aspect of the invention, there is provided a system for producing an interactive plan of a location from an optical image of a plan of the same location, wherein the location includes a plurality of features of different types such as cabins and corridors, the system comprising:
- a complex geometry and character recognition (COGCR) process which is applied to the optical image to determine a plurality of functional data representative of the plurality of features of different types;
- a processor for converting the plurality of functional data into a plurality of object models;
- a display for combining the object models to construct the interactive plan for display to an end user.

Optionally, the interactive plan responds to an end user interaction with the object models in the plan to carry out predetermined functions.

Optionally, different COGCR processes are applied to different types of features to thereby produce different types of functional data for different types of features.

Optionally, each type of functional data converts to a predetermined type of object model.

Optionally, functional data comprises symbols on the optical image of the plan which are recognized by a mask representative of a predetermined symbol being passed over the surface of the optical image to locate one or more symbols on the optical image which corresponds to the mask which symbols are then stored in a database with an associated location.

Optionally, each symbol of interest is located in the optical image.

Optionally, the identified symbol locations give rise to an associated object model which is applied to the interactive plan.

Optionally, the functional data relates to entities, such as cabins and corridors, and an entity is identified and defined by one or more topographical rules and one or more entities that match the one or more topographical rules are stored along with the location of each entity that matches the one or more topographical rules.

Optionally, an object model corresponding to the entity is formed.

Optionally, the object model includes details of the shape of the entity which is determined by tokenizing the image into predetermined shape elements or color elements.

Optionally, certain objects are classified and identified as cabins or the like for use in the interactive plan.

Optionally, the optical image includes alpha numeric representations, and the system further comprises an optical character recognition process for identifying alpha numeric characters and forming an object model thereof for use in the interactive plan.

Optionally, any lines and corners identified during the processing of the image form a set of vectors indicating the direction and size of movement from one pixel to the next in an identified line or corner.

Optionally, rules are applied at any point to control processing of the optical image to form the interactive plan.

Optionally, a layout of the interactive plan is drawn and the object models from any process are added to the layout to form a representation of the optical image in the form of a display of the interactive plan.

Optionally, end user interaction with the display of the interactive plan is detected and used to carry out an action based on the interaction.

Optionally, the interactive plan is linked to a booking flow to enable an end user to interact within the interactive plan, to select an entity, such as a cabin for booking, and complete the booking if the entity is available.

Optionally, the system comprises a mobile device including an application to allow an end user to use the interactive plan in combination with the application for obtaining directions to a requested location.

The present invention offers a number of advantages. The present invention enables the identification of any kind of functional objects (cabins, elevators, etc) that can be found on an interactive plan. The search results are shown graphically, which makes them more user friendly. There is an opportunity to use new search criteria such as proximity to points of interest, cabin size, etc. The invention further provides a ship navigator, cabin finder and/or 3D plan which may be downloaded onto a personal digital assistant (PDA) to obtain directions to a requested location to enable navigation around the ship. The invention provides automatic data acquisition from any type of plan and is not limited to the environment of ships and cruisers.

Other advantages will be evident from the following description.

This invention offers a real advantage to any cruise application which uses plans for booking purposes. The invention provides the end user with a graphical interface which is easy to manipulate and provides the administrator of a reservation system with a tool to automatically generate this graphical interface. Also, the invention makes it possible to have new ways of driving the flow of searching, identifying and booking a cabin.

An advantage of this solution is that an image can be built, such that all elements can be interactive as opposed to the static image of the past which required substantial processing to offer any form of dynamic functionality.

BRIEF DESCRIPTION OF THE DRAWINGS

Reference will now be made, by way of example, to the accompanying drawings, in which.

DETAILED DESCRIPTION OF THE INVENTION

Figure 1:
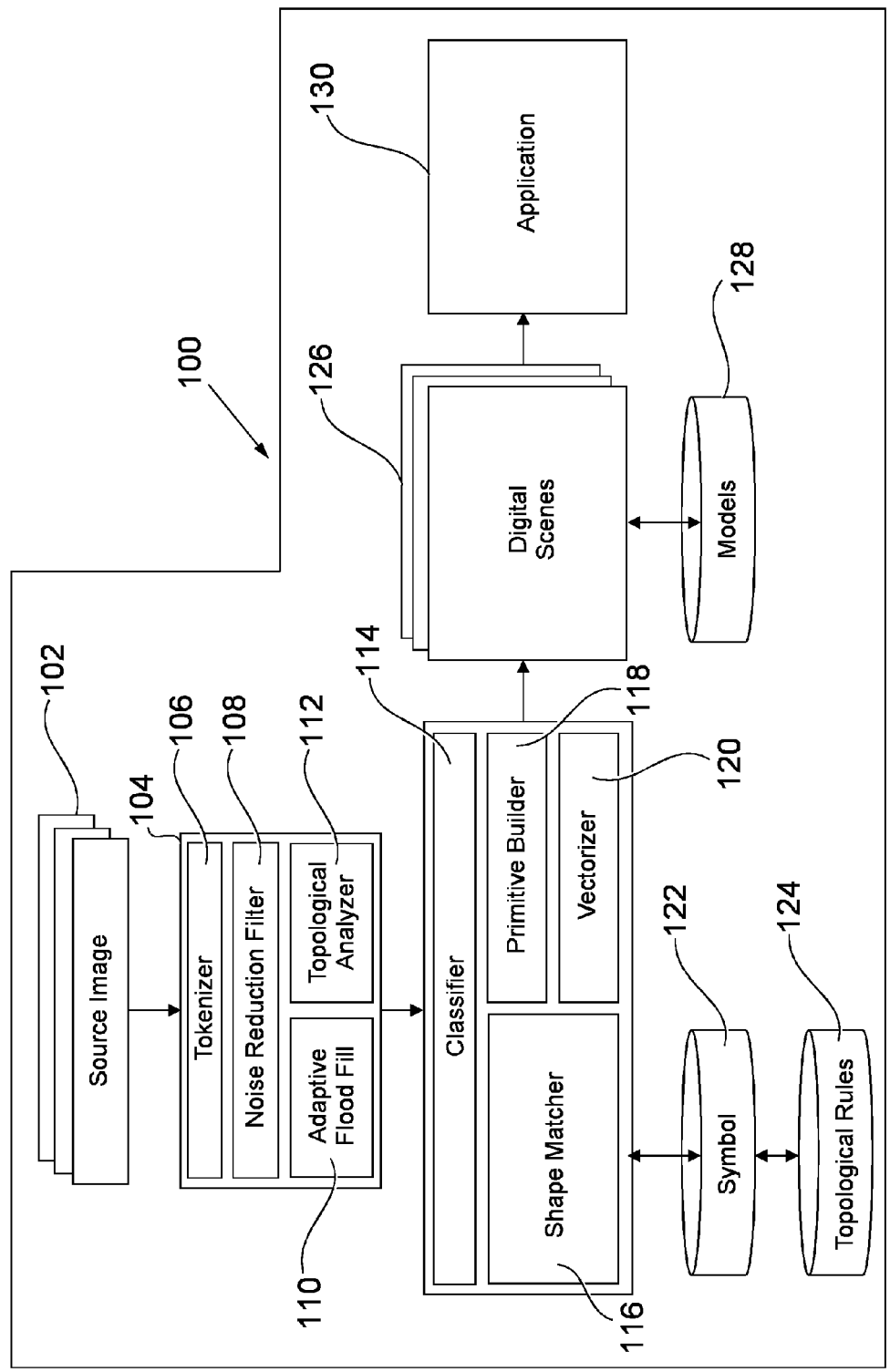
FIG. 1 is a block diagram of data acquisition process, in accordance with an embodiment of the invention.

The present invention relates to a method and system for automatically generating an interactive deck plan and to use it to improve an end user's experience in a booking process. The system generates an interactive deck plan in combination with a reservation system. The method creates functional data for building an interactive deck plan in a usable object model. The invention further comprises a process for acquiring data to build the interactive deck plan and a process for displaying the acquired data.

In the present description, the word 'plan' relates to representations of buildings, ships, aircraft and the like as well as to representations of geographical sites.

The end user can choose to book a specific cabin by selecting an image of a specific cabin on the interactive deck plan. The end user can then finalize the booking process through the reservation system by reference to the cabin number of the selected cabin. The cabin number provides a link to associate the selected image of the cabin on the interactive deck plan and the corresponding cabin reference in the reservation system.

The representation of a cabin on the interactive deck plan, in accordance with the present invention, provides additional descriptive features or criteria relating to the cabin. The additional descriptive criteria take into account the environment of the cabin relative to the deck, for example, the external environment of the cabin. The existing reservation systems cannot technically afford to process such criteria for the booking process, due to the amount of processing required. In the present invention, the end user has more available information relating to a cabin before choosing a cabin which best matches the required preferences. Having found out all the information about the cabin in question, booking the cabin can be achieved instantly and directly with the booking system. If the cabin is not available, the graphical interface will prevent the user from selecting it.

The present invention relates to a cruise reservation and booking flow but can be applied to any application that might use a plan of resources in a reservation process or system. The object of the cruise reservation system is to sell all cabins on a particular cruise. Currently, a travel agent or an end user who uses a cruise booking application has no access to any kind of visual information concerning the ship that can be manipulated and is interactive.

The interactive ship plan of the present invention is effectively part of the booking flow, at the cabin selection step. The information is stored as functional data (e.g., in XML format) and is linked with information from the booking process, allowing interactions between the application and the interactive deck plan, in a bi-directional manner. Adding an interactive plan directly to the booking flow significantly improves the selection of the cabin.

This invention enables an administrator to model a cruise ship or any object that can be modeled by a plan in the framework of a booking process. The framework may be extended to the modeling of any bookable resource that may include a plan. Other possibilities in the process flow may also be proposed, such as the ability to start the reservation process by a cabin selection.

The invention includes two main parts.

A first part is an automatic method of computing functional data which is used to build an interactive plan. In one embodiment of the invention, this is complex geometry and optical character recognition (CGOCR) of existing deck plans.

A second part is an automatic method to display the data derived from the first part as an enhanced interactive interface.

These two parts may be applied to the business of cruises and other travel applications, whilst the CGOCR may be applied to provide data as an interactive display to feed any type of reservation system content or indeed any application domain where an interactive plan might be useful.

The first part of the invention will now be described in greater detail below.

The present invention takes a static plan image and converts this automatically into functional data that represents the existing static plan, which can then be presented to the end user as an interactive interface. The invention then uses a data source to build an interactive deck plan image. The original image data is converted into usable object models representing all elements and characteristics of the optical deck plan. There are a number of categories of elements or characteristics, each of which is handled in a different manner, as will be described below.

Referring initially to FIG. 1, a complex geometry and optical character recognition (CGOCR) 100 is shown. The following description will give a brief resume of the various elements of the CGOCR which will then be described in further detail below. The CGOCR shown generally at 100 includes a source of images 102, such as an original optical deck plan or plans of a ship. The CGOCR also includes a processing block 104; which includes a tokenizer 106; a noise reduction filter 108; an adaptive flood fill module 110; and a topological analyzer 112. The noise reduction filter is applied to the image to reduce the noise level in the optical image of the deck plan.

The noise level in the image derives from the scanning process of the static plan image. The scanning process may comprise scanning a print out of the static deck plan. This scanning process adds at least two sources of noise from the input image. One source is a result of the optical chain, such as lenses, scanner glass window defects, scratches, stains, light irregularities, etc in the original imaging devices.

The other source of noise is due to the "lossy" compression of the format used, for example a JPEG image may produce an approximation of the original bitmap resulting from the scan which is already subject to the optical noise as indicated above.

The CGOCR further includes a classifier 114 which carries out shape matching in a shape matcher module 116 and further includes a primitive builder 118 and a vectorizer 120. The shape matcher receives symbols from a database 122 and topological rules from a database 124. The output from the classifier produces a plurality of digital scenes 126. The digital scenes are stored in a database of models 128 to be used by an application 130 as will be described in further detail below.

A typical deck plan will include the layout of each deck including the position of various articles. For example the deck plan may show cabins, elevators, storage spaces, details and names of the above mentioned articles, social places such as restaurants, bars or theatres and any other appropriate environment or article.

In accordance with the present invention, the objective is to convert these scans of decks into usable functional data. In order to achieve this it is necessary to define the most basic or simple elements of a domain language appropriate to the ship (the object model). In this way, symbols and patterns can be applied to a deck image in order to generate functional data that could be exploited to rebuild the interactive image. In doing this, using the object model, the image is transformed into functional data that is used to create the graphical interface. As a result, subsequent use of a pointer, such as a pointer device click, can be processed. The richness of the object model is also used to correct the result of the low level scanner which may be used when identifying the least identifiable basic or simple elements.

As previously mentioned, the present invention determines a set of functional data to store, generate, display and manipulate images which can be applied to the cruise booking flow. This is achieved by use of a domain Model View Controller pattern (MVC) applied to a deck plan. The data is processed by a display engine, to draw the plan in a viewer, where the view is interactive. This will be described in greater detail below.

The solution of the present invention requires considerably less overhead than the use of several images in the prior art, and the functional data is easily maintainable, for example in XML format. This is particularly the case where there are changes in the ship plan. The fact that the deck plan for the ship is stored as a set of functional data means that it can be manipulated by a computer program, thereby making the functional data more flexible to use. In addition, due to the nature of the functional data more information associated with the deck plan can be displayed when a scaling factor changes, in other words zooming in to display more detail.

An advantage of this solution is that a plan can be built, where all elements can be interactive as opposed to the static image of the past which required substantial processing to offer any form of dynamic function.

The present invention makes use of JAVASCRIPT for the logical part, HTML5 with Canvas objects for the display and Extensible Markup Language (XML) to store functional data. It will be appreciated however that any other relevant standards or formats may be used.

The sequence of identifying the functional data may occur in parallel with multiple processes occurring at the same time; or in series where the processes may be carried out in any particular order.

A first part of identifying the functional data is to determine the basic elements, for example symbols, patterns, features or elements which appear on a deck plan. This is needed to generate an exploitable data representation of some or all of the elements of the deck plan and thereby to produce the interactive plan.

In the case of a deck plan a number of specific processes will be used in order to generate an exploitable set of functional data to build interactive deck plans. The processes will be identifying entities to enable static plan images to be modeled. At least the following elements will be analyzed and considered in the construction of functional data.

Image processing functions will identify lines, points, curves, corners etc. as basic elements required for drawing the interactive deck plan. Certain topological rules will be assumed whilst identifying functional data, these may include the following:

- a cabin will always be a closed shape;
- cabins will generally be surrounded by the vessel superstructure (i.e. there can be no "floating cabins" found outside the perimeter of the vessel);
- a cabin will include cabin labels which generally follow a regular sequence;
- low level iconic basic elements tend to follow a given distribution, for example elevators may always be found at the end of corridors, escape stairs may always be in a similar position, life jackets are always in the same location on each deck, etc. The fact that certain elements follow basic distribution rules can be used to recognize simple elements within more complex parts of the deck plan.

The first set of features that will be analyzed is symbols on the deck plan. The deck plan includes a plurality of specific symbols that are generally standardized across the cruise industry, although different cruise lines may have variations on the standards as will be seen below. The symbols may be located at multiple points on the deck plan. A symbol is a specific figure or glyph and a definition is required for each specific symbol so that the processor should be able to identify and detect them. The following two tables show a list of specific symbols for two different cruise lines to illustrate the nature and associated description of each symbol. It will be appreciated that many other symbols and associated description may be used beyond those illustrated below.

EXAMPLE 1

| | |
|---|---|
| † | Third or Fourth Bed Available |
| ✱ | Third Bed Available |
| ♿ | Handicapped Access |
| ↕ | Connecting Staterooms |
| △ | Stateroom with sofa bed |
| ♀ | Women's Restroom |
| ♂ | Men's Restroom |
| ✤ | Stateroom with sofa bed and third PULLMAN bed available |

EXAMPLE 2

| | |
|---|---|
| † | Third or Fourth Bed Available |
| ✱ | Third Bed Available |
| ▲▲ | 2 additional upper foldaway berths |
| ♿ | Handicapped Access |
| ▓·· | Sofa bed |
| ↕ | Connecting Staterooms |
| ▭ | Sofa bed sleeps two |
| △ | Family Stateroom Up to 6 people |
| ♀ | Women's Restroom |
| ♂ | Men's Restroom |
| ▲ | One upper foldaway berth |
| ● | Double bed |

Each of the basic symbols can be referred to as a glyph or pictogram. In order to identify and detect the symbols on the original deck plan the image of the deck plan is processed as follows. A mask exists for each of the known symbols for the specific cruise liner. For each symbol the mask is applied to the plan and a raster scan is carried out over the surface of the plan in order to identify the position of each occurrence of the symbol in question. The coordinates of each occurrence of a particular symbol are identified and stored. This process is repeated for each of the symbols until a detailed representation of the location of all the relevant symbols has been obtained and the coordinates stored.

Certain symbols may have associated rules which prevent them from being associated with certain areas of the deck plan. The rules are provided in an appropriate database. For example, if the symbol for a sofa bed is located in a corridor area the system will recognize that this is not possible. As a result the symbol for the sofa bed will be associated with the closest recognized cabin, as a rule for sofa beds insists that it must be located within a cabin. The rules augment the use of the mask and raster scan in identification of symbols and thus ensure that the functional data associated with a given symbol is not misassociated with an area that is unacceptable in accordance with the rules. The results of the scans include the coordinates of each symbol stored in an appropriate database with an associated description. The stored symbol results have become functional data that can be accessed when building the interactive deck plan. The symbols used can come from any suitable location or source. Many other types of symbol can be envisaged. The symbols for a particular ship are generally identified before the functional data is constructed.

Symbols are relatively simple entities to detect and identify. The deck plan includes considerably more complex entities and different processes are required to identify these more complex entities.

To identify the more complex entities, processes using patterns and topographical rules are used. A pattern is composed of a set of topographical rules. For example, a cabin is defined by three main topographical rules, namely: the cabin is a closed space, the cabin is surrounded by the vessel superstructure and the cabin labels follow a regular sequence. If a number of entities are identified as having the same pattern this also allows identification of entities of a similar or same family. An example of a family of similar entities is cabins.

On a deck plan there may be several entities matching the basic pattern of a cabin. As such, so that cabins can be isolated from other similar structures, a specific object structure corresponding to a cabin is created, as shown below:
aCabinInstance {name: 1534,
length: 40,
width: 16,
position:[32,212],
shape:"rect",
cat:"D1",
service:[{name:"ConnectingStaterooms"},
{name:"StateroomWithSofaBed"}]

The above object structure represents a cabin named 1534 and includes details of the shape, size or other information in a format that can be readily accessed in order to be introduced into the interactive deck plan. A similar object structure will exist for every other cabin on each deck and again will be available to be introduced into the interactive deck plan.

The attributes relating to shape and size of a cabin are determined within the tokenizer. The tokenizer looks for shapes, lines, corners and any other significant shape related information that are called shape elements. Cabins are generally expected to be rectilinear, although there are some cabins which take different shapes. However, for the purpose of the next part of the description it is assumed that the cabin is rectilinear. The image of the deck plan is analyzed by the tokenizer. The tokenizer moves from pixel to pixel and finds homogeneous pixels that appear to relate to the features in the deck plan. Each pixel is analyzed to determine whether each or any of its neighbors form, in combination, part of a line or other shape. In this manner each pixel which represents, for example part of cabin, will be examined to identify a shape from one pixel to the next pixel of the same or similar color. When analyzing colors, the test is not for equality but for similarity. Slight differences in color are permitted as long as they are within a given threshold.

Figure 2:
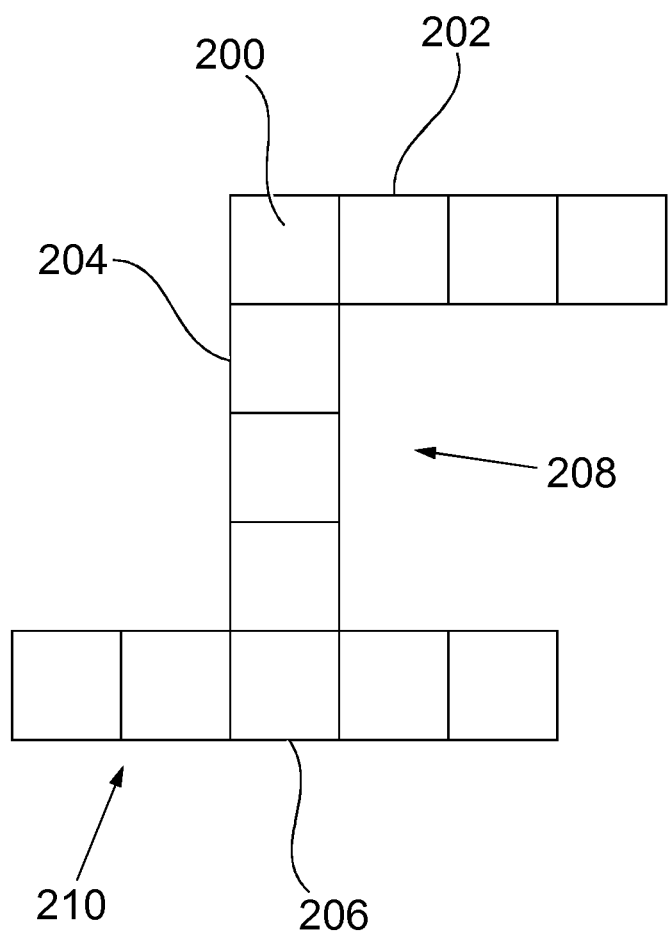
FIG. 2, is a simplified diagram showing pixel positions, in accordance with an embodiment of the invention.

This will now be explained in greater detail with reference to FIG. 2. FIG. 2 shows a number of identified pixels. The first identified is pixel 200. By scanning all the neighbors of pixel 200, two neighbors are identified. These are pixel 202 to the right of original pixel 200 and 204 below the original picture pixel 200. All other pixels surrounding pixel 200 do not appear to form part of a straight line or shape related structure and are given no further analysis at this time. The nearest neighbors of pixel 202 and 204 are then analyzed for their nearest neighbors and gradually a picture is built up of a shape which could represent two walls of a cabin. At pixel 206, a T-junction is formed between the upward line of pixels 208 and a horizontal line to pixels 210. Pixel 200 is a corner pixel. Continuation of the analysis of nearest neighbors of pixels builds up a detailed structure of linear elements in the deck plan. A structure including four corners connected by lines is generally considered to represent a cabin. After a more defined shape has been determined, i.e. a square or rectangle, a space is defined between the shape borders. The defined space may be "in-filled" by the adaptive flood fill module 110 in FIG. 1. The whole deck plan is analyzed as described above to identify linear features, cabins and other sorts of spaces of particular shapes and sizes and areas to fill-in if possible.

Figure 3:
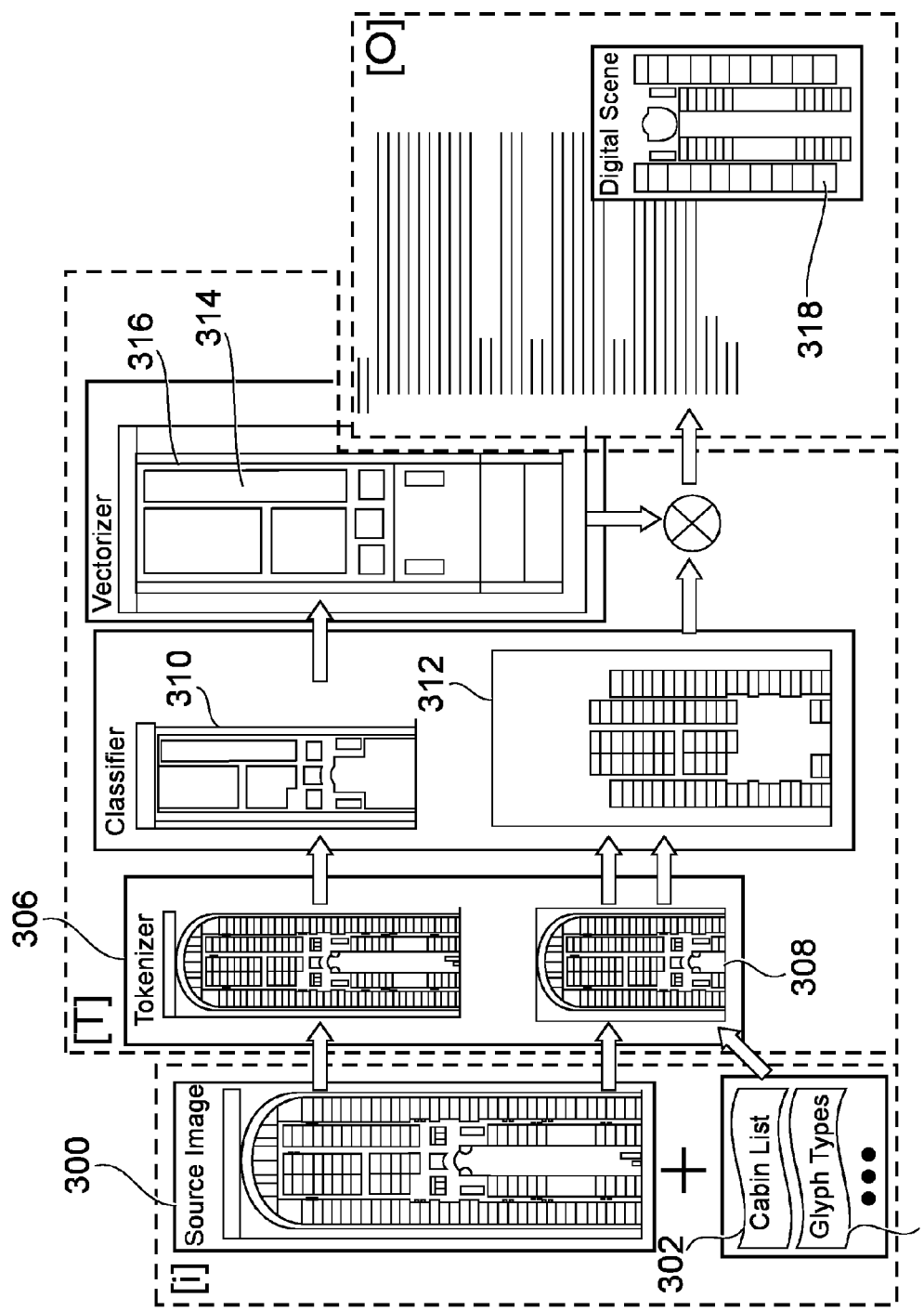
FIG. 3, is this schematic diagram showing the various steps of generating an interactive deck plan describing the data acquisition process in more detail in accordance with an embodiment of the invention.

Referring to FIG. 3, the overall generation process is described in more detail. A source image 300 of the original deck plan is obtained and filtered as previously mentioned. In addition, the cruise company provides a list of cabins 302 and the type of symbols 304 (as described above) that they use. Details of the static plan image 300 when processed by the tokenizer are shown as 306 as described above. The tokenizer object recognizes the colors and basic shapes and attributes of the features shown in the source image.

An optical character recognition process is applied to the source image in conjunction with the cabin list and symbol types to generate a data object 308, which includes the symbols and recognizes the cabin numbers of the cabins.

The data object 302 (for example the list of cabins) and the OCR object 308 (for example the label) are processed by the classifier (114 in FIG. 1). The classifier will attempt to match the 'OCR objects' coming from the tokenizer to the '302' list of cabins thus removing any false positive results (i.e. spurious labels that may have been created be error). This ensures that only valid cabin labels are used.

The classifier makes use of the shape matcher (116 in FIG. 1) along with the databases for symbols and topographical rules. The classifier processes the tokenizer image to identify features that relate to corridors and other spaces which are not readily classified as cabins by the tokenizer. This could take into account certain topographical rules stored in database 124 of FIG. 1. The data object produced, shown as 310 in FIG. 3, indicates the corridors and other spaces that cannot be readily classified.

The processing of the optical character recognition object 308 by the classifier produces a detailed representation of the symbols and cabin numbers. The resultant classifier optical character recognition data representation is shown as 312 in FIG. 3. Again, access to the cabin list and symbol types assist in the process of producing the data object 312. The result of the OCR recognition process may be cross checked with the rules (i.e. cabin numbers should generally be ordered, they should follow a specific regular expression and/or make use of a database of the actual numbers).

At the end of the data acquisition phase, an intermediate functional representation of all deck plan images processed by the tokenizer, optical character recognition process and the classifier are obtained.

The results of the process of tokenizing and classifying the image as carried out by the tokenizer and classifier are related to the positions of each of the identified pixels. In a further step, as carried out by the vectorizer 314, the pixels and lines identified in the data representations 306 and 310 are changed to convert them into points and vectors from one point to the next. The image is shown as 314. In other words, the shape features are represented by coordinates. The vectorizer image shows a number of points one of which is shown as 316, where it is not clear that the line on which the point exists is continuous or not. This is based on anomalies in the process. However, since the line appears to be continuous, the points are ignored and the line is assumed to be continuous. The vectorizer shows the boundary pixels of the shapes. The original curves may be used instead by adding more vectorial segments in the shape descriptor with a result which is an approximate representation of 310.

If the classifier fails, the vectorizer may still present a valid boundary pixel and maybe used to close the opened vectorial shape. This step is called a topological closure. In order to produce the final functional data of the deck plan the vectorized representation 314 and the classified optical character recognition representation 312 are combined to produce functional data 318. A more detailed representation of the functional data 318 will be shown and described with reference to FIGS. 5 and 6 in a later part of the description. The digital scene 318 shows the cabins and their number from the optical character recognition representation and removes all non-cabin related information except for information that is particularly of interest to a potential passenger, such as the position of the elevators and the like.

The following example shows some of the information about the format and type of functional data relating to the information about the ship, in this case as an XML file structure.

```
<ship name="">
    <categories>
        <service name=" " image=" " text=" "/>
            <category code=" " description="" color=""
            cabinPhotograph =" " cabinPlan=" "/>
            ...
            ...
    </categories>
    <decks>
        <deck name="" layout=" ">
            <cabins>
                <cabin name="" length="" width="" position=""
                shape="" cat=" ">
                    <service name=" "/>
                </cabin>
            </cabins>
        </deck>
    </decks>
</ship>
```

The legend is represented as follows:

```
<service name=" ThirdBedAvailable" image="cross.png" text="Third Bed
Available"/>
```

The legend is used by the cabins, while retrieving information for a service, which is represented by a symbol on the plan. These are now identified in the services listed and may include: additional beds; restrooms; handicapped access; and connecting rooms. Connecting rooms are represented by a double arrow and the double arrow is an attribute of both cabins. Based on the number and/or the position of two cabins, they can seem to be connected. This is not always the case. However, when using the present invention there is no chance of confusion as the attributes of the two cabins will clearly identify the connecting cabin by means of the double arrow, even if the two cabins do not have consecutive numbers or the two seem to be apart.

The categories are defined as follows:

```
<category code="D1" description="" color="#0000CC" cabinPhotograph
="cabinPhotograph D1.png" cabinPlan="cabinPlanD1.png"/>
```

The category information is retrieved by the display engine, while drawing the cabins. Graphically, each cabin category has a specific color, but it also has other attributes, for example a private veranda, special services, etc.

The decks are represented as follows:

```
<deck name="DECK FIFTEEN" layout="DECK FIFTEEN.png"/>
```

The layout is used as the background image for the deck plan. The layout of the deck plan can be thought of as lines and thus it to can be stored as data in the set of functional data, if necessary.

In the example where there are two types of cabins: a rectangle-shaped cabin and a polygonal cabin will be represented differently, as follows:

```
<cabin name="1534" length="40" width="16" position="[32,212]"
shape="rect"
cat="D1">
    <service name="doubleArrowBottom" />
    <service name="triangle" />
</cabin>
```

The rectangular cabins have five attributes: the name, the shape (rectangular), the length and width (in pixels), and the position of the top left corner (in pixels, from the top left corner of the deck plan). Any special services offered by the cabin are listed as child attributes of the cabin.

A polygonal cabin has less attributes: its shape (polygonal), the coordinates of the points counter-clockwise (in pixels, from the top left corner of the layout) and its category, as follows.

```
<cabin name="1292" points
="[[206,680],[254,680],[254,696],[246,696],[246,720],[206,720]]"
shape="poly" cat="OS" />
```

The above are examples and it will be clear that there are many other functional representations in different situations and circumstances. In different applications there will be also different types of features that are considered and as a result still further functional representations. The different functional data will depend on the specific application in which this invention is used.

The above functional data of the invention are represented in XML as previously indicated. The XML is read by a JAVASCRIPT program, which translates the logical object models into visual objects, such as cabins or other images to display to the end-user.

The functional data can be represented by a canvas element as follows:

```
<canvas width="300px" height="1520px" id="deckMapImage"
></canvas>
```

The canvas element is an HTML5 element that enables a programmer to create an individualized image. The canvas element can be used to view and modify the image with JAVASCRIPT, as described in for example, the Mozilla Developer Network tutorial. The HTML5 canvas is one possible implementation. Other vectorial viewers (such as FLASH, etc) may be used instead.

Figure 4:
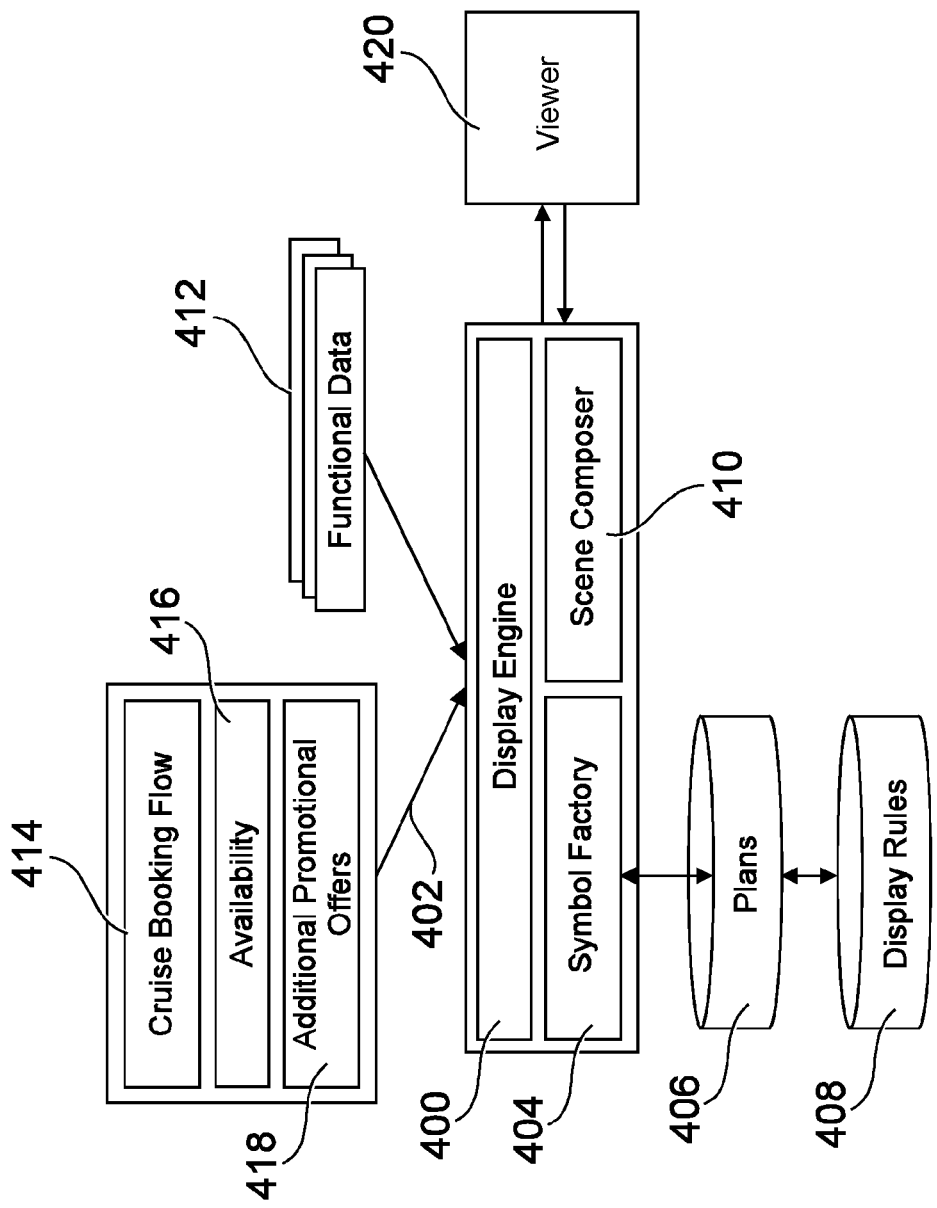
FIG. 4 is a block diagram of the image building process and system, in accordance with an embodiment of the invention.

The system also includes a display engine which is also a JAVASCRIPT file that up-loads the XML and parses it into a Date Object Model (DOM) object. The display engine 400 then loads data from the cruise line 402 (as shown in FIG. 4) to identify which cabins are available. Afterwards, the display engine draws the layout of the deck, on which are drawn all the cabins of a particular deck and in which all the available cabins are highlighted. The services are then drawn, represented by their symbols and a picture of a cabin of the given category and the plan thereof can be displayed in a frame.

The display engine 400 in FIG. 4 will now be described in greater detail. The display engine includes a symbol factory 404 which has access to plans 406 and display rules 408. The display engine further includes a scene composer 410. The display engine receives functional data from a functional data module 412; this functional data has been derived from the CGOCR processing. The symbol factory and the scene composer are linked in terms of their function and object models corresponding to symbols are generated. The display engine is also in communication with a cruise booking flow 414, which provides information relating to availability 416 and potentially additional promotional offers 418. The display engine combines the necessary elements as above described to present to the end user on a viewer 420.

The result is one single interactive image representing a deck, with the available cabins being highlighted in a specific way. The interactive image representing the deck can then be used by an end user to determine information relating to the deck, including availability of cabins. When the mouse or a pointer of the end user points at a canvas element in the interactive image, an algorithm compares the position of the mouse to the position of the cabins on the interactive image of the deck plan. If the mouse is pointing at a cabin, the cabin is highlighted. Information relating to this cabin, such as category is displayed and the availability of the cabin is indicated in a predetermined manner (for example, the cabin may show up as a specific color, indicating that it may be booked). The end user can then select the cabin by clicking on the mouse. This results in the cabin being booked by the end user. Further operations can then be carried out such as taking passenger details, payment, etc.

Figure 5:
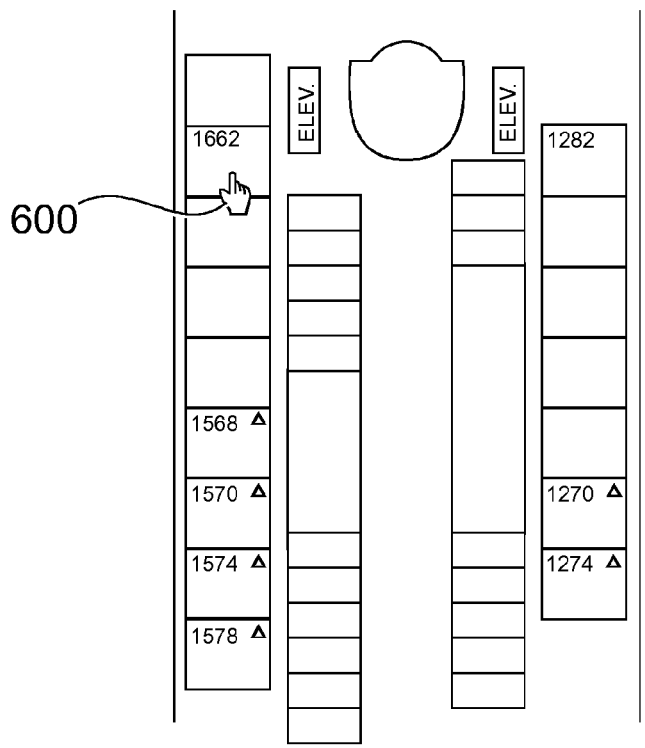
FIGS. 5 and 6 are examples of interactive deck plans, in accordance with an embodiment of the invention.
Figure 6:
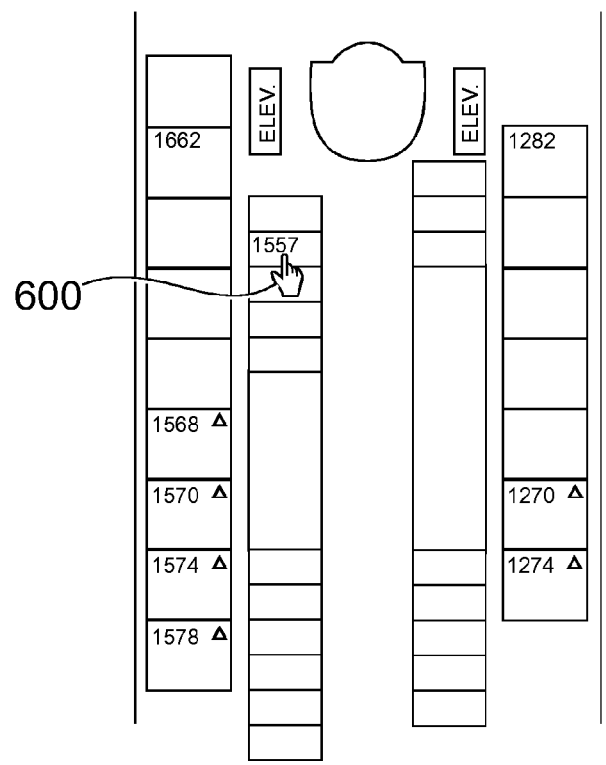

FIGS. 5 and 6 show a representative example of an interactive image of a part of the deck plan, as generated by the present invention. In FIG. 5 a pointer is pointing at an available cabin and further action in respect of the pointer (i.e., clicking the mouse in the vicinity of the cabin) will result in further information being available or a booking being made. In FIG. 6 the mouse is pointing to an unavailable cabin, which in this instance is shown by the hand 600. The end user then moves on to attempt to select a different cabin which might be available. The end user does not waste time identifying features of the first selected cabin, as the end user can immediately see the cabin is not available.

Based on the system and method described above an interactive deck plan can be generated in a matter of minutes, and the whole ship can be processed in less than an hour.

Traditionally, a booking flow is carried out by first selecting a geographical area, a date and one or several Cruise liners. A ship may then be selected along with a fare and a cabin category. This may generate a list of a limited number of cabins to choose from. Using the present invention, once the ship is selected, the end user may navigate the deck plans and select an available cabin based on various criteria before entering any further information. The various criteria used to select the cabin, may include: the position in the ship; cabin category; cabin layout; cabin size; fare; the availability of services and equipments, such as handicapped access, folding beds, connecting rooms etc.; the proximity of restaurants, theatres etc.; group booking requirements, etc. In other words, an end user can go straight to the interactive deck plan, select a cabin and then proceed with further aspects of the booking, such as end user identification, payment etc. In addition, as the cabin is an object, the end user can request the search of the deck plan to be limited to cabins having specific services, such as handicapped access etc.

As previously mentioned an interactive image of a plan can be generated for other applications such as restaurants, hotels, trains, and even planes.

Figure 7:
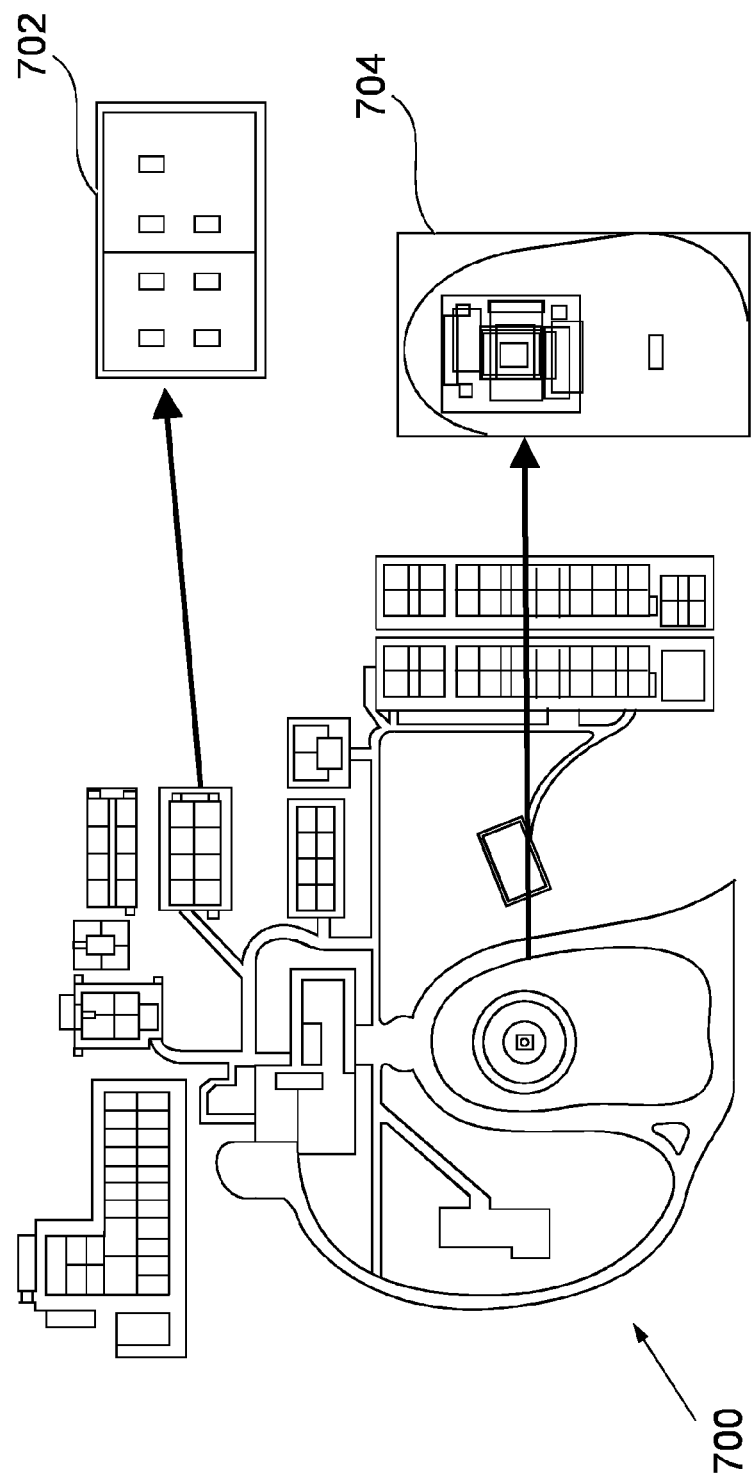
FIG. 7 is a diagram showing an alternative interactive plan for a hotel village, in accordance with an embodiment of the invention.

FIG. 7 shows an example of another plan of a hotel village having a number of chalets located at different locations in a specific area. An original plan 700 of a hotel in a national park is shown alongside the elements 702 and 704 which relate to interactive images created by the process according to the present invention. In a similar way to that described above, an end user can use the interactive image to select cabins or view other parts of the hotel.

The interactive deck plan offers a huge advantage to both the cruise liners and passengers when booking vacations on a ship.

Once an interactive deck plan has been created, it is possible to develop applications based on it. In addition, if the deck plans change, new interactive deck plans can be built easily and quickly.

The interactive deck plan could be made available on a number of different resources, such as a display or screen on a computer, a smart phone, or other personal electronic interfaces, such as a tablet computer. Within the domain of mobile devices such as smart phones and tablets, applications could be included which allow the end user to interact with the interactive deck plan when mobile. In addition, the end user may use the interactive plan and application in a combined sense to obtain directions to a location as requested by the end user. Thus, the end user can find certain places within the ship whilst on their voyage. For example the end user may ask for directions to a restaurant from a particular location. The fact that the interactive plan is built from functional data rather than being a flat static image means there is no end to the different types of applications that can be used. For example, the end user may identify a golf range, and use the interactive plan to effect booking of a golf session or lesson.

A person skilled in the art will understand that some or all of the functional entities as well as the processes themselves may be embodied in software, or one or more software-enabled modules and/or devices, or in any combination thereof. The software may operate on any appropriate computer or other machine and the modules may form an integral part of the computer or machine. The operation of the invention provides a number of transformations, such as the various processes for changing different parts of a still image into interactive objects which can then be combined to generate a complete interactive plan that is equivalent in terms of features to the original plan. The ability for an end user to interact with the interactive plan produces still further transformations in a variety of different manners.

The embodiments of the automatic method of computing functional data and the automatic method to display the functional data as an enhanced interactive interface described herein may be embodied in one or more applications. Each application may generally comprise one or more instructions stored as program code that may be read from a memory by a processor and which may cause the processor to perform one or more operations when executed by the processor to thereby perform the steps necessary to execute steps, elements, and/or blocks embodying the various aspects of the invention. As such, the routines and/or instructions which may be executed by the processor to implement embodiments of the invention, whether implemented as part of an operating system or a specific application, component, program, object, module, or sequence of operations executed by the at least one processor will be referred to herein as "computer program code" or simply "program code." Given the many ways in which program code embodiment in a computer program may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The system described hereinabove may be a computing apparatus that includes one or more processors for executing one or more instructions to perform and/or cause components of the computing apparatus to perform one or more operations consistent with embodiments of the invention. The computing apparatus includes a memory, and may include applications and data structures stored by the memory. The memory may represent random access memory (RAM) comprising the main storage of a computer, as well as any supplemental levels of memory, e.g., cache memories, non-volatile or backup memories (e.g., programmable or flash memories), mass storage memory, read-only memories (ROM), etc. In addition, the memory may be considered to include memory storage physically located elsewhere, e.g., cache memory in a processor of any computing system in communication with the user device, as well as any storage device on any computing system in communication with the user device (e.g., a remote storage database, a memory device of a remote computing device, cloud storage etc.).

The computing apparatus further includes an input/output interface and a human-machine interface coupled by the input/output interface with the processor. The input/output interface may be configured to receive data from input sources and output data to output sources. For example, the input/output interface may receive input data from a user input device such as a keyboard, mouse, microphone, touch screen, and other such user input devices, and the input/output interface may output data to one or more user output devices such as a display (e.g., a computer monitor), a touch screen, speakers, and/or other such output devices that may be used to output data in a format understandable to a user. In some embodiments of the invention, user input data may be communicated to the processor using a user input device such as a keyboard or touch screen utilizing the input/output interface. The computing device may be physically connected with a network for receiving and transmitting data.

The program code is capable of being individually or collectively distributed as a program product in a variety of different forms and, in particular, may be distributed using a computer readable media. Such computer readable media may include computer readable storage media and communication media. Computer readable storage media, which is non-transitory in nature, may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by the computing apparatus. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

The invention can be extended to any kind of appropriate situation as above described. The creation of an interactive image over previously non-interactive image may have a still broader application outside of the travel domain. The ability to convert a plan into a series of objects, in accordance with the present invention could be used in many different applications such as hotels, lodges, stadia, theatres, restaurants and any other situation where the geographical features of an element are important when the end users make a choice. It will be appreciated that this invention may be varied in many different ways and still remain within the intended scope of the invention.

The invention claimed is:

1. A method of producing an interactive plan from an image including a plurality of features of different types, the features of a first type each including a character representation that identifies the feature within the image, the method comprising:

for each feature of the plurality of features, applying, by a processor, a complex geometry and optical recognition process to the feature to produce functional data, the functional data comprising a plurality of structures each including a predetermined combination of one or more shape elements and a predetermined function;

for each feature of the plurality of features, converting, by the processor, the functional data into an object model by:

generating a vector representation for each of the structures to define the object model;

applying an optical character recognition process to identify alphanumeric characters within the feature;

comparing the alphanumeric characters with a list of words or numbers each corresponding to one of the character representations that identifies features of the first type within the image; and in response to the alphanumeric characters matching one of the words or numbers, associating the object model with the corresponding character representation to classify the object model as being a first type of object model;

linking, by the processor, each of the object models of the first type with a booking flow based on the associated character representation to construct the interactive plan for display to an end user; and configuring, by the processor, each of the object models of the first type to carry out the predetermined function related to the linked booking flow in response to end user interaction with the object model.

2. The method of claim 1 further comprising:

displaying the interactive plan and responding to the end user interaction with the object models in the interactive plan to carry out the predetermined functions.

3. The method of claim 1 wherein the plurality of structures includes a first type of structure and a second type of structure, and further comprising:

applying a first predetermined combination of one or more shape elements to determine the first type of structure and a second predetermined combination of one or more shape elements to determine the second type of structure to produce different types of object models.

4. The method of claim 3 wherein generating the vector representation for the first type of structure produces a first type of vector representation, and generating the vector representation for the second type of structure produces a second type of vector representation, and further comprising:

converting each combination including the first type of vector representation to the first type of object model and each combination including the second type of vector representation to a second type of object model.

5. The method of claim 1 wherein the object models comprise symbols on the image, and further comprising:

applying a mask representative of a predetermined symbol over the image;

determining locations of one or more symbols on the image which correspond to the mask; and storing the determined locations of the one or more symbols in a database.

6. The method of claim 5 wherein the image includes multiple types of symbols, and applying the mask, determining the locations, and storing the determined locations are performed for each type of symbol.

7. The method of claim 5 further comprising:

recovering the determined locations from the database; and creating an associated object model to apply to the interactive plan.

8. The method of claim 1 wherein the object models relate to objects in the image, and further comprising:

defining the objects by one or more topographical rules;

locating the objects that match the one or more topographical rules; and storing the location of each object located.

9. The method of claim 8 wherein each object corresponds to one of the structures.

10. The method of claim 8 wherein each object model includes details of a shape of the object, and further comprising:

determining the shapes of the objects by tokenizing the image into predetermined shape elements or color elements.

11. The method of claim 10 wherein the image comprises a plurality of pixels, and tokenizing the image comprises:

moving from one pixel to another pixel searching for homogenous pixels which appear to relate to one of the features in the image;

analyzing each pixel to determine whether any neighboring pixels form, in combination with the pixel being analyzed, a combination of pixels that comprise a portion of a predetermined shape element or color element; and building a database of shape elements or color elements and locations thereof for use in the interactive plan.

12. The method of claim 8 wherein each object comprises one of a cabin, a cabin with an extra bed available, a cabin with handicapped access, a cabin with an additional foldaway birth, a corridor, a stairwell, a stateroom, a connecting stateroom, a family stateroom, a stateroom with a sofa bed, a woman's restroom, and a men's restroom.

13. The method of claim 1 further comprising:

removing the character representations that fail to match any of the words or numbers in the list.

14. The method of claim 1 further comprising:

classifying some or all of the object models to enable identification of a position of a pixel.

15. The method of claim 1 wherein the shape elements include lines and corners, and generating the vector representation of each of the structures comprises:

vectorizing the lines and corners to form a set of vectors each indicating a direction and a size of movement from one point in the image to a next point in the image.

16. The method of claim 1 further comprising:
applying rules to control processing of the image to form the interactive plan.

17. The method of claim 1 further comprising:
drawing a layout of the interactive plan and adding the object models to form a representation of the image as a display of the interactive plan.

18. The method of claim 17 further comprising:
detecting an end user interaction with the display of the interactive plan; and
carrying out an action based on the interaction.

19. The method of claim 1 wherein linking the object models of the first type in the interactive plan to the booking flow based on the associated character representation enables the end user to select an object for booking, and complete the booking if the selected object is available.

20. The method of claim 1 further comprising:
downloading a navigator application into a mobile device, the navigator application configured to cause the mobile device to, in response to receiving a request for directions to a requested location, provide directions to the requested location using the interactive plan.

21. The method of claim 1 wherein a different complex geometry and optical recognition process is applied to each feature of the plurality of features based on the type of the feature to produce a different type of functional data.

22. A system for producing an interactive plan from an image comprising a plurality of features of different types, the features of a first type each including a character representation that identifies the feature within the image, the system comprising:
a processor; and
a memory coupled to the processor, the memory including instructions configured to, when executed by the processor, cause the system to:
for each feature of the plurality of features, apply a complex geometry and optical recognition process to the feature to produce functional data, the functional data comprising a plurality of structures each including a predetermined combination of one or more shape elements and a predetermined function;
for each feature of the plurality of features, convert the functional data into an object model by:
generating a vector representation for each of the structures to define the object model;
applying an optical character recognition process to identify alphanumeric characters within the feature;
comparing the alphanumeric characters with a list of words or numbers each corresponding to one of the character representations that identifies features of the first type within the image; and
in response to the alphanumeric characters matching one of the words or numbers, associating the object model with the corresponding character representation to classify the object model as being a first type of object model;
link each of the object models of the first type with a booking flow based on the associated character representation to construct the interactive plan for display to an end user; and
configure each of the object models of the first type to carry out the predetermined function related to the linked booking flow in response to end user interaction with the object model.

23. The system of claim 22 wherein the instructions are further configured to cause the system to:
display the interactive plan and respond to the end user interaction with the object models in the interactive plan to carry out the predetermined functions.

24. The system of claim 22 wherein the plurality of structures includes a first type of structure and a second type of structure, and the instructions are further configured to cause the system to:
apply a first predetermined combination of one or more shape elements to determine the first type of structure and a second predetermined combination of one or more shape elements to determine the second type of structure to produce different types of object models.

25. The system of claim 24 wherein generating the vector representation for the first type of structure produces a first type of vector representation, and generating the vector representation for the second type of structure produces a second type of vector representation, and the instructions are further configured to cause the system to:
convert each combination including the first type of vector representation to the first type of object model and each combination including the second type of vector representation to a second type of object model.

26. The system of claim 22 further comprising:
a database,
wherein the object models comprise symbols on the image, and the instructions are further configured to cause the system to:
apply a mask representative of a predetermined symbol over the image;
determine locations of one or more symbols on the image which correspond to the mask; and
store the determined locations of the one or more symbols in the database.

27. The system of claim 26 wherein the image includes multiple types of symbols, and the instructions are further configured to cause the system to apply the mask, determine the locations, and store the determined locations for each type of symbol.

28. The system of claim 26 wherein the instructions are further configured to cause the system to:
recover the determined locations from the database; and
create an associated object model which is applied to the interactive plan.

29. The system of claim 22 wherein the object models relate to objects in the image, and the instructions are further configured to cause the system to:
define the objects by one or more topographical rules;
locate the objects that match the one or more topographical rules; and
store the location of each object located.

30. The system of claim 29 wherein each object corresponds to one of the structures.

31. The system of claim 29 wherein each object model includes details of a shape of the object, and the instructions are further configured to cause the system to:
determine the shapes of the objects by tokenizing the image into predetermined shape elements or color elements.

32. The system of claim 29 wherein each object comprises one of a cabin, a cabin with an extra bed available, a cabin with handicapped access, a cabin with an additional foldaway birth, a corridor, a stairwell, a stateroom, a connecting stateroom, a family stateroom, a stateroom with a sofa bed, a woman's restroom, and a men's restroom.

33. The system of claim 22 wherein the instructions are further configured to cause the system to remove the character representations having alphanumeric characters that fail to match any of the words or numbers in the list.

34. The system of claim 22 wherein the shape elements include lines and corners, and the system generates the vector representation of each of the structures by:
   vectorizing the lines and corners to form a set of vectors each indicating a direction and a size of movement from one point in the image to a next point in the image.

35. The system of claim 22 wherein the instructions are further configured to cause the system to:
   apply rules to control processing of the image to form the interactive plan.

36. The system of claim 22 wherein the instructions are further configured to cause the system to:
   draw a layout of the interactive plan and add the object models to form a representation of the image as a display of the interactive plan.

37. The system of claim 36 wherein the instructions are further configured to cause the system to:
   detect an end user interaction with the display of the interactive plan; and
   carry out an action based on the interaction.

38. The system of claim 22 wherein linking the object models of the first type in the interactive plan to the booking flow based on the associated character representation enables the end user to select an object for booking, and complete the booking if the selected object is available.

39. The system of claim 22 further comprising:
   a mobile device including an application configured to, in response to receiving a request for directions to a requested location, cause the mobile device to use the interactive plan to provide directions to the requested location.

40. The system of claim 22 wherein the instructions are further configured to cause the system to apply a different complex geometry and optical recognition process to each feature of the plurality of features based on the type of the feature to produce a different type of functional data.

41. A computer program product for producing an interactive plan from an image comprising a plurality of features of different types, the features of a first type each including a character representation that identifies the feature within the image, the computer program product comprising:
   a non-transitory computer readable storage medium; and
   instructions stored on the non-transitory computer readable storage medium, the instructions being configured to, when executed by a processor, cause the processor to:
   for each feature of the plurality of features, apply a complex geometry and optical recognition process to the feature to produce functional data, the functional data comprising a plurality of structures each including a predetermined combination of one or more shape elements and a predetermined function;
   for each feature of the plurality of features, convert the functional data into an object model by:
      generating a vector representation for each of the structures to define the object model;
      applying an optical character recognition process to identify alphanumeric characters within the feature;
      comparing the alphanumeric characters with a list of words or numbers each corresponding to one of the character representations that identifies features of the first type within the image; and
      in response to the alphanumeric characters matching one of the words or numbers, associating the object model with the corresponding character representation to classify the object model as being a first type of object model;
   link each of the object models of the first type with a booking flow based on the associated character representation to construct the interactive plan for display to an end user; and
   configure each of the object models of the first type to carry out the predetermined function related to the linked booking flow in response to end user interaction with the object model.

* * * * *